(12) United States Patent
Cho

(10) Patent No.: US 6,781,541 B1
(45) Date of Patent: Aug. 24, 2004

(54) ESTIMATION AND CORRECTION OF PHASE FOR FOCUSING SEARCH MODE SAR IMAGES FORMED BY RANGE MIGRATION ALGORITHM

(75) Inventor: Kwang M. Cho, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/630,889

(22) Filed: Jul. 30, 2003

(51) Int. Cl.[7] .............................................. G01S 13/90
(52) U.S. Cl. ......................... 342/25; 342/195; 342/196
(58) Field of Search ........................... 342/25, 195, 196

(56) References Cited

U.S. PATENT DOCUMENTS

| | | | | |
|---|---|---|---|---|
| 5,248,976 A | * | 9/1993 | Niho et al. | 342/25 |
| 6,018,306 A | * | 1/2000 | Serbin | 342/25 |
| 6,492,932 B1 | * | 12/2002 | Jin et al. | 342/25 |
| 6,661,369 B1 | * | 12/2003 | Cho | 342/25 |
| 6,670,907 B2 | * | 12/2003 | Cho | 342/25 |

* cited by examiner

Primary Examiner—Ian J. Lobo
(74) Attorney, Agent, or Firm—Leonard A. Alkov

(57) ABSTRACT

A method for acquiring synthetic aperture images of stationary targets converts a plurality of radar signals stored as digital values and motion compensated to a first order into a well focused image. The digital values are Fourier transformed, match filtered and interpolated using a Stolt interpolator, then skewed to reorient distortions arising from imperfect motion compensation, generating an image data, descriptive of the stationary targets in the range and azimuth direction. The image data is divided into a plurality of overlapping sub-patches in, preferably, the cross track (azimuth) direction. Each sub-patch containing a portion of the image data and overlapping data. The overlapping data is part of the image data and common between two or more of the overlapping sub-patches.

Each of the overlapping sub-patches is individually focused using autofocus means to obtain focused sub-patches having a phase. The phase is adjusted for each of the focused sub patches to obtain a continuous phase with respect to one or more of the focused sub-patches, thereby obtaining smooth phase transition sub-patches. The synthetic aperture images of stationary targets are computed after concatenating the smooth phase transition sub-patches.

16 Claims, 13 Drawing Sheets

ESTIMATION AND CORRECTION OF PHASE FOR FOCUSING SEARCH MODE SAR IMAGES FORMED BY RANGE MIGRATION ALGORITHM

BACKGROUND OF THE INVENTION

1. Field of Invention

This invention is in the field of signal processing of phase correction for focusing images obtained from Synthetic Aperture Radar (SAR).

2. Description of the Related Art

Synthetic aperture radar (SAR) systems image fixed, stationary radar scatterers (targets) at a range on the ground by coherently integrating information from returns derived from multiple radar pulses. SAR renders a high resolution ground map of the radar scatterers (targets) by coherently combining reflected radar return signals acquired with a moving antenna having a significant component of velocity in the cross range direction.

Coherent integration of returns from multiple pulses acquired while moving in the cross range direction is theoretically equivalent to carrying a large antenna having an extent in the cross range direction equivalent to the distance traveled during the pulse acquisition. Coherent integration of returns from pulses, and subsequent formation of focused SAR images requires accurate information on platform position and velocity. The returns from each transmitted pulse need to be aligned, or motion compensated to a high degree to maintain the phase coherent aspect of the SAR imaging process. Uncompensated motion error results in smearing (or de-focusing) of the SAR image. Thus, to obtain better identification of ground objects, improving phase compensation for better image resolution is a main goals in the advanced SAR systems.

Motion compensation based on accelerometers, inertial navigation and typical navigation motion information is typically not sufficient to assure coherent integration for a well focused image. Thus, autofocus functions, depending on a prominent radar scattering target within the image itself, estimate residual phase error from partially processed video phase history (VPH) data. This reduces the residual phase error for a focused image.

For the formation of SAR images using autofocus mechanisms has been used in SAR systems. The autofocus is based on the compensation of platform motion (typically antenna phase center) to a stationary, reference target on ground. One example is the Polar Format Algorithm (PFA). Problems with PFA, however, are geometric distortion and spatially variant de-focusing increasing with distance from the reference target. To limit the de-focusing related to these problems, the prior art divides the imaged area in range for sub-swaths and in azimuth for sub-patches, reducing the distance from the reference target. Separate motion compensation using a reference target is used in each sub-swath and sub-patch. This prior art sub-swath and sub-patch processing, however, does not maintain useful magnitude and phase continuity over all the sub-swaths and sub-patches required of typical interferometric SAR (IFSAR) processing, or coherent change detection (CCD).

Another approach of the prior art to the problems of geometric distortion and limited depth of focus over larger image sizes is the range migration algorithm (RMA). RMA requires motion compensation along a line in the focus plane and allows imaging of a relatively large map without subswath/sub-patch processing. One of the difficulties with the RMA is in the implementation of autofocus function during the batch processing as normally done with the PFA. The difficulty comes from the fact that phase histories from different targets after range compression do not align in time. Because of this alignment difficulty, not observed in the case of PFA, some new systems implement the autofocus function before actual RMA processing starts at the cost of additional image formation processing based on PFA or range-Doppler algorithm. This additional computing burden reduces increases the cost of the SAR imaging processor and/or time delay for image rendition.

Another approach of implementing autofocus function is to use partially processed data by RMA during batch processing with additional processing. This requires shifting of signal support depending on the target location in azimuth. When image is oriented in the direction other than range-azimuth, data skew is additionally required, further posing a computing burden.

Using search mode images formed using RMA, azimuth coverage in a single patch is large compared with that in spot mode, while resolution is lower. Shifting of signal support for a target is proportional to the displacement of targets in azimuth. Thus, data length after shifting signal support is typically too large for practical application with existing memory/computer capability.

SUMMARY OF THE INVENTION

Above limitations are minimized by a method for acquiring synthetic aperture images of stationary targets using a radar system, said radar system located on a moving platform, the platform moving in the along track direction, comprising the steps of:

converting a plurality of radar signals reflected from stationary targets located on a ground patch into digital values;

storing said digital values;

computing an along track Fourier transform of said digital values;

performing matched filter functions;

motion compensating said digital values stored within said memory to a first approximation of motion of said moving platform;

interpolating said digital values to generate interpolated values, generally using a Stolt interpolator;

skewing said interpolated values to reorient distortions arising from said first approximation of motion in a preferred direction thereby generating an image data, said image data descriptive of said stationary targets in a range direction and a cross-track direction;

dividing said image data into a plurality of overlapping sub-patches in, preferably, the azimuth direction, each sub-patch containing a portion of said image data and overlapping data, said overlapping data part of said image data and common between two or more of said overlapping sub-patches;

focusing each of said overlapping sub-patches individually using usual SAR autofocus means to obtain focused sub-patches having a phase using such methods as the phase gradient autofocus algorithm or a multiple discrete autofocus algorithm;

adjusting said phase of each of said focused sub patches to obtain a continuous phase with respect to one or more of said focused sub-patches, thereby obtaining smooth phase transition sub-patches;

extracting said synthetic aperture images of stationary targets after concatenating said smooth phase transition sub-patches.

Skewing said interpolated values is first computed in one direction and subsequently in a second direction, where the first direction is perpendicular to the second direction.

For smoothing purposes across two or more sub-patches, the phase of a each sub-patch is calculated by integrating twice the second derivatives of target phase descriptive of all of said stationary targets contained within each of said focused sub-patches and computing the weighted average of said second derivatives.

Another method for smoothing purposes for computing phase is calculated by removing constant terms and linear terms in said phase using said overlapping data.

DETAILED DESCRIPTION

This invention introduces an apparatus and method for processing radar data to obtain a focused SAR image of a ground patch. The process divides the whole imaging area, the patch, into multiple sub-patches for separate estimation and correction of phase error in each sub-patch. Phase error correction maintains continuity of phase between neighboring sub-patches to ensure magnitude and phase continuity in the processed complex imagery. Process loading is minimized during phase estimation and correction in each sub-patch. An efficient processing sequence is presented that includes skewing image, shifting signal support, and a smoothing phase transition.

Figure 1:
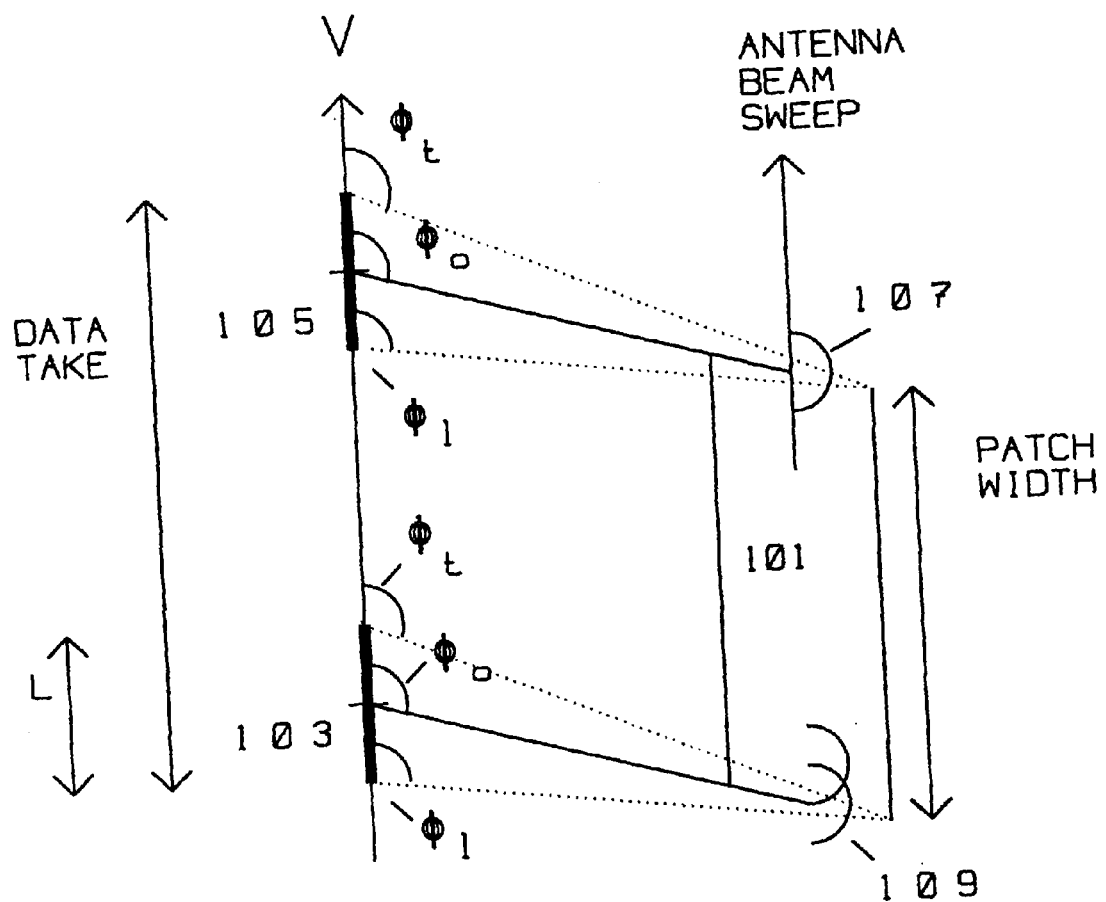
FIG. 1 is an exemplary SAR configuration of the prior art acquiring a data take over a patch.

FIG. 1 shows the typical geometric relationship between a moving platform carrying a radar transmitter/receiver using Synthetic Aperture (SAR) methods and target area (patch) 101 to be imaged by said radar transmitter/receiver. The moving platform is initially at position 103, travels with velocity V in the direction shown. The antenna is pointing at a side looking angle $\phi_0$ with respect to velocity V. The moving platform moves from position 103 to position 105, while maintaining angle $\phi_0$ constant. Imaging pulses are transmitted and received at each position 103, position 105, and in between. At position 103 for example, the target area 101 is illuminated by beamwidth 109. Similarly, at position 105, beamwidth 107 covers part of target area 101. L is the extent of the antenna aperture while the data take takes into account all the data pulses used to cover patch 101. SAR radar is well known in the art and described by M. Skolnik in Radar Handbook, McGraw Hill, 1970, incorporated herein by reference in its entirety.

In Synthetic Aperture Radar (SAR) return processing for image formation applicable to this invention, the mathematical treatment calls for two domains of interest. One is the spatial domain where the familiar length, width, height and time parameters are used. The other domain is not quite as physically intuitive, as it is the frequency domain, where frequencies of occurrence of certain features present in the spatial domain are reflected. In the frequency domain, parameters of length, width, height and time are no longer immediately discernible, but rather interact in accordance with a transform. This transform, usually the Fourier Transform and its inverse, is used to change from the spatial domain to the frequency domain. The Fast Fourier Transform, or FFT, is an efficient tool to perform the Fourier Transform.

Signals in the two domains, s and S can be conveniently related by the Fourier transform, FT, for two variables X and Y in spatial domain and their counterparts $K_X$ and $K_Y$ in the frequency domain. The relationship is defined by:

$$S(K_x) = FT\{s(X)\} = \int \delta(X) e^{-j2\pi X K_x} dX \quad (1A)$$

$$S(K_y) = FT\{s(Y)\} = \int \delta(Y) e^{-j2\pi Y K_y} dY \quad (1B)$$

Spectrum in the frequency domain that corresponds to a SAR image is the integrated result of individual spectra corresponding to each target in the image, as each radar scatterer contributes to the overall spectrum.

In search mode, radar beam sweeps the ground by maintaining constant antenna azimuth angle $\phi_0$ as the radar platform travels as illustrated in FIG. 1.

Another simplifying variable for facilitating subsequent analysis in the frequency domain is $K_R$, the fast time variable. The following expressions for three variables in spatial frequency domain are useful.

$$K_R = \frac{2}{\lambda}\left\{1 + \frac{\gamma}{f_c}\Delta t\right\} \quad (2)$$

$$K_X = -K_R \cos\phi$$

$$K_Y = \sqrt{K_R^2 - K_x^2}$$

where $\lambda$ is the wave length, $\gamma$ is the chirp slope of the linearly frequency modulated (LFM) waveform transmitted, $f_c$ is the radar center frequency, $\phi$ is the Doppler cone angle, and $\Delta t$ is the fast time variable within a pulse width.

Processing starts with the fast time variable $K_R$ in the range direction and the slow time variable in the along track (AT) direction. The first step is to convert from $K_R$ to $K_Y$ through Stolt interpolation.

Figure 2:
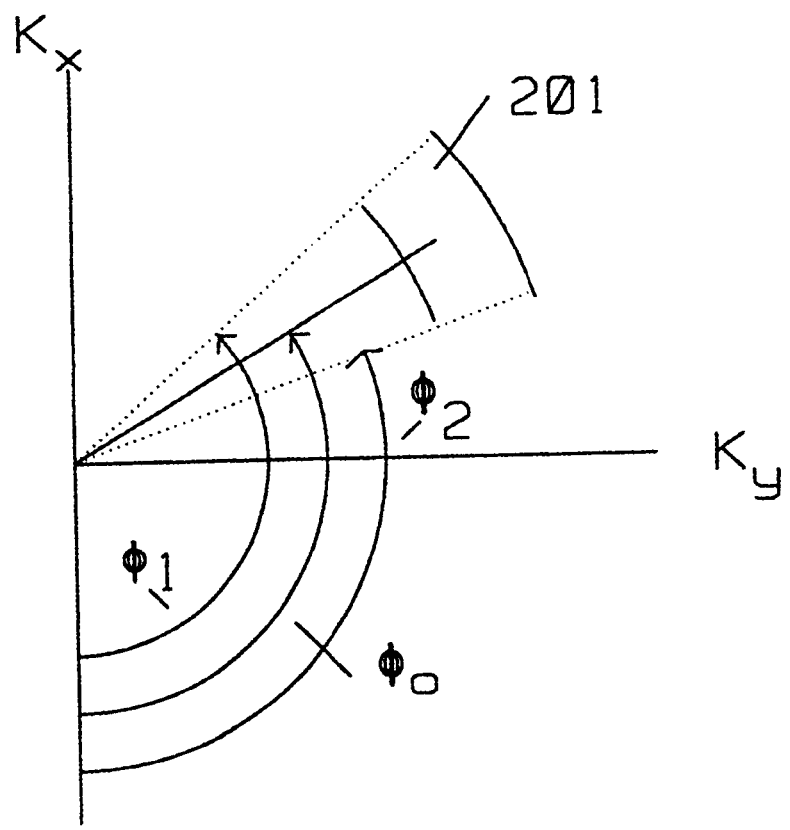
FIG. 2 is the signal support in the frequency domain for exemplary SAR data of FIG. 1 using narrow bean antenna.

Doppler cone angle and its variation are the same for all targets. Therefore, the effective signal support area determined by the antenna main beam from all targets are overlapped. However, as indicated in the FIG. 1, time of collection array for each target varies depending on the target location in the AT direction. FIG. 2 illustrates the overlapped signal supports of all targets in the frequency domain for patch 201. Time at the leading edge of the collection array for all targets $t_{1l}$ through $t_{2l}$ varies as indicated in FIG. 1 and FIG. 2. As shown, the overlapped signal returns from all targets, are mis-aligned in time, that is there is not smooth phase function extending it either range or cross range, with respect to the center of aperture as indicated by $\phi_0$.

It is therefore an objective of this invention to align the phase of the returns within the aperture. That is, the relations between target displacement and the computed shift of signal returns in the frequency domain will facilitate alignment in time of the signal return from all areas of patch 101. Consider two targets displaced by $\Delta X$ in the AT direction as shown in spatial domain portion of FIG. 3. Then, for mapping range R, wavelength $\lambda$, and Doppler cone angle $\phi$, shift of signal support in $K_x$, given by $\Delta K_{shift}$ in the frequency domain portion of FIG. 3 can be expressed by:

$$\Delta K_{X_{shift}} = \frac{2}{\lambda} \frac{\Delta \phi}{\sin \phi} = \frac{2 \Delta X}{R \lambda} \quad (3)$$

Figure 3:
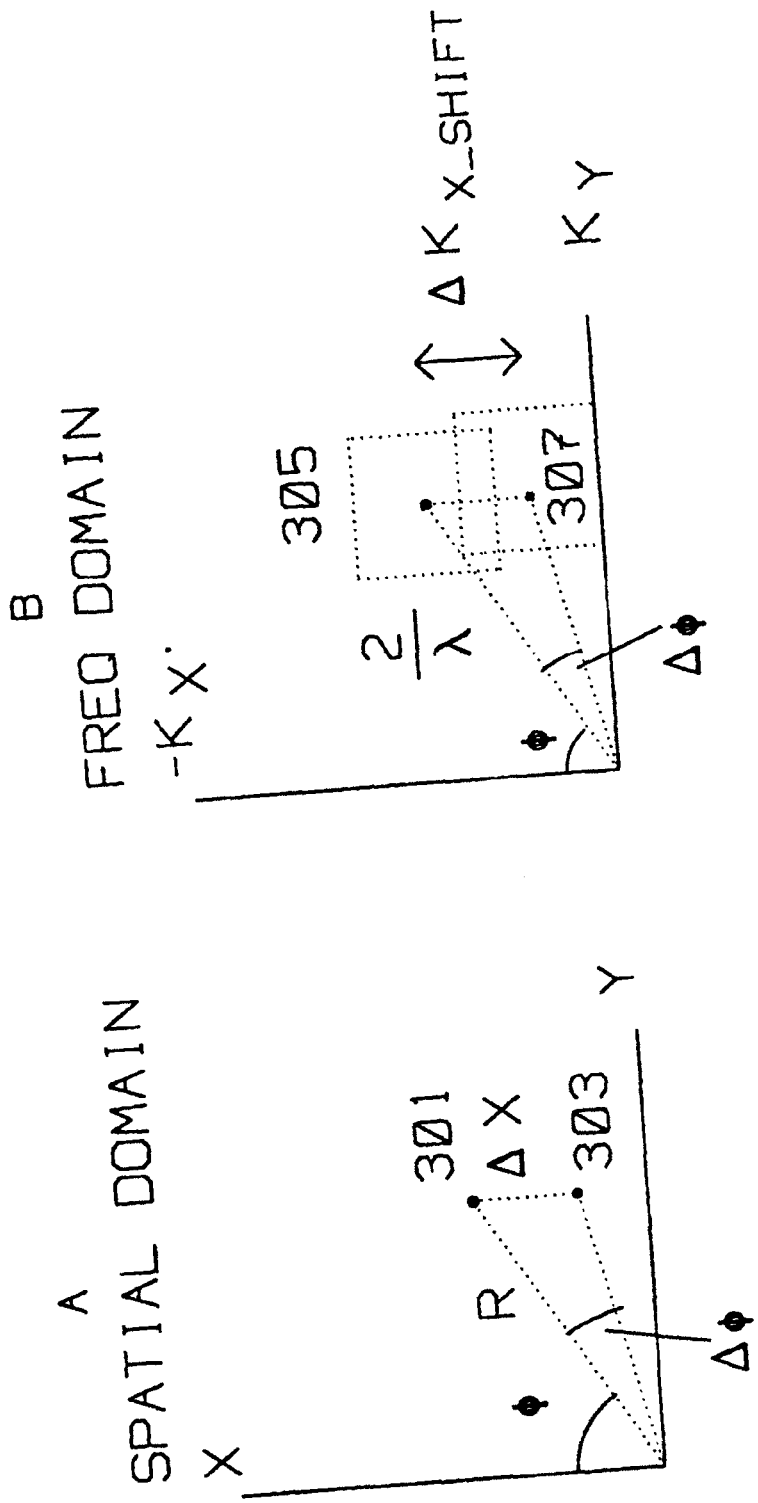
FIG. 3 is an exemplary target displacement in the along-track (AT) direction shown in the spatial domain and corresponding shift in signal support in the frequency domain.

In FIG. 3, location 301 in the spatial domain is shifted by an amount $\Delta X$ to location 303. Equivalently, in the frequency domain, the spectrum designated by the dotted lines at 305 is shifted by an amount $\Delta K_{shift}$ to a spectrum located around location 307.

Processing Functions

Signal processing for this invention's improvement in SAR imaging autofocus starts by taking the output after Stolt interpolation of radar A/D data. Stolt interpolation is also called a grid deformation or Stolt mapping and is conceptually equivalent to a complex interpolator. Stolt interpolation basics are discussed in *Migration by Fourier Transform*, Stolt, R. H., Geophysics, 43, 23–48, 1978, incorporated herein in its entirety by reference.

The method of this invention can be implemented in any existing systems that employ the Range Migration Algorithm (RMA) for image formation using Stolt interpolation. SAR image formation based on RMA is discussed in *Spotlight Synthetic Aperture Radar* Carrara, W. G. et al, Chapter 10, Artech House, 1995 incorporated herein by reference in its entirety.

The method of this invention has three parts:

a) Transform data so that image smearing is aligned in the direction of the image pixels. The data transformation is comprised of two basic functions to skew the radar data horizontally and vertically.

b) Compute phase error estimation and correction by taking partial images on a sub-patch basis. The function of this second part is shifting of signal support so that they are aligned in time before applying any parametric or non-parametric auto-focus algorithms for phase error estimation. Processing of sub-patches can be implemented in parallel for fast processing. For the continuity of magnitude and phase in the image domain, continuity is maintained for the phase between estimated phases from neighboring sub-patches. For correct focus and phase continuity in the image domain, the sub-patches and phases estimated from sub-patches are overlapped.

c) Inverse processing of parts (a) and (b). This is for de-skewing the composite image after concatenating focused sub-patch images. Focused image with desired resolution is obtained by taking two-dimensional FFT to obtain image output in the spatial domain.

Processing functions in part (a) and (b) will be described in this section. Parameters for each function will be derived as required. Functions in part (c) are the inverse of parts (a) and (b) as shown. FIG. 4 illustrates all functional method steps applicable to the three parts.

Part a)—Horizontal and Vertical Image Skew

Part a) is comprised of two image skew functions: the first in the horizontal direction, the second in the vertical direction, perpendicular to the first.

Figure 5:
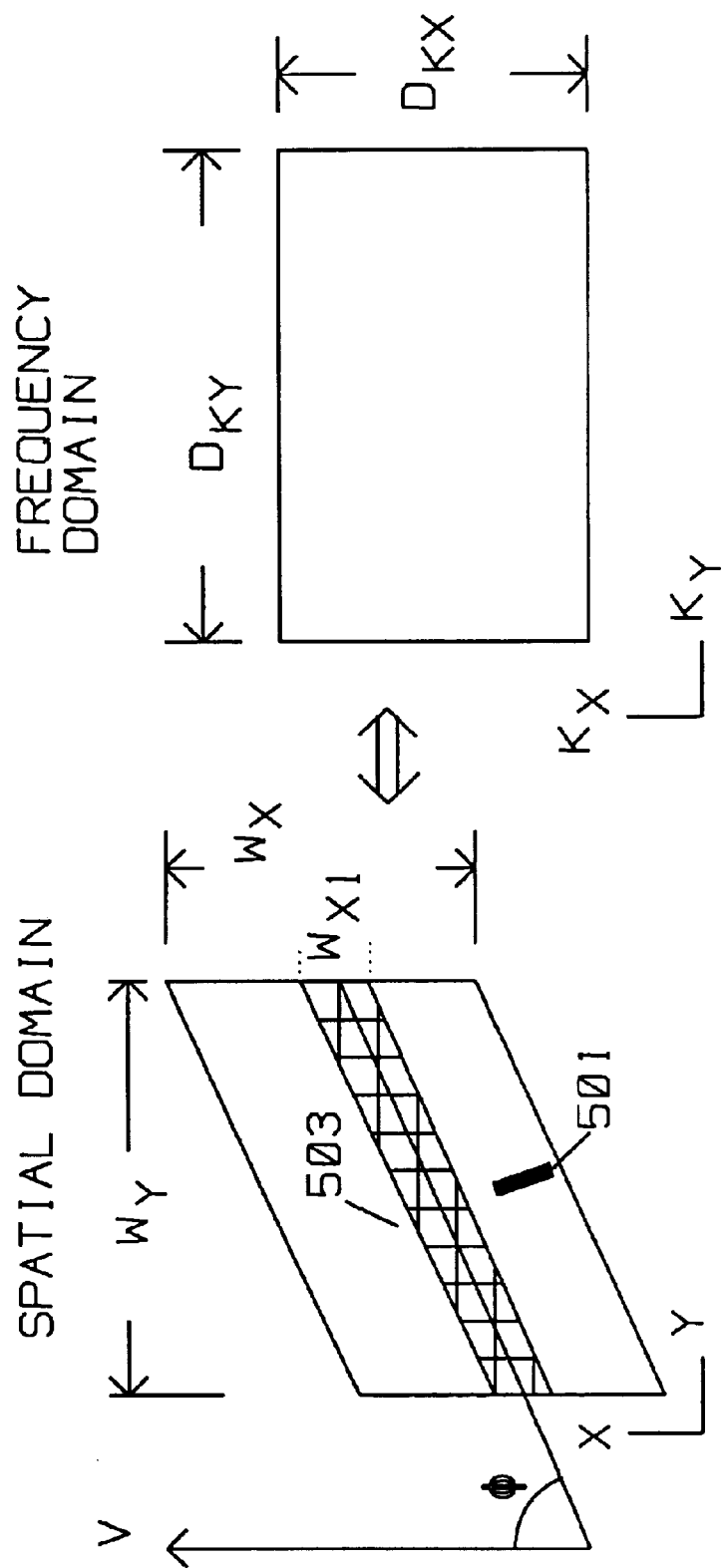
FIG. 5 details the smearing of a target in the spatial domain and its equivalent in the frequency domain.

Zero padding is provided for room for skewing image and shifting signal support. In general case of non-zero squint angles, target image is smeared in the cross-range (or can be called azimuth) direction if compensation of sensor motion is not sufficiently accurate. Image smearing is not aligned in the direction of image pixels unless the (final) formed image is oriented in range and azimuth. Since image patches formed by RMA are long, it is desired to generate images oriented in the along-track (AT) and cross-track (CT) direction. As a result, in search scenes oriented in AT-CT with non-zero squint angles, target images are smeared not vertically but at an angle from the vertical direction. Consider a formed image patch illustrated in FIG. 5, spatial domain. Patch widths in AT and CT are indicated by $W_X$ and $W_Y$, respectively, and sub-patch width $W_{X1}$ is indicated by the cross-hatched area. Corresponding spectrum in spatial frequency domain is illustrated in FIG. 5, frequency domain portion, with corresponding widths $D_{KX}$ and $D_{KY}$.

It should be noted that the smeared target image 501 is in the azimuth direction and it is not aligned to the vertical pixel direction. To get focused target image by correcting phase error in the frequency domain through one dimensional processing it is required to make the target smearing aligned to the direction of pixels. This is accomplished by the first function in part a) by skewing image in the horizontal direction. Angle of target smearing is directly determined by Doppler cone angle $\phi$ and non-integer pixel shifting in Y is required for given pixel displacement in X. Since shifting in image domain can equivalently be done by applying linear phase in the frequency domain, this can be achieved by Fourier transform and application of linear phase as indicated by $FFT_{KX}$ and $\theta_{skew}$ in FIG. 4.

$\theta_{skew}$ has the expression:

$$\theta_{skew}(X, K_y) = 2\pi \cdot \cot \phi \cdot X \cdot K_Y \quad (4)$$

Figure 6:
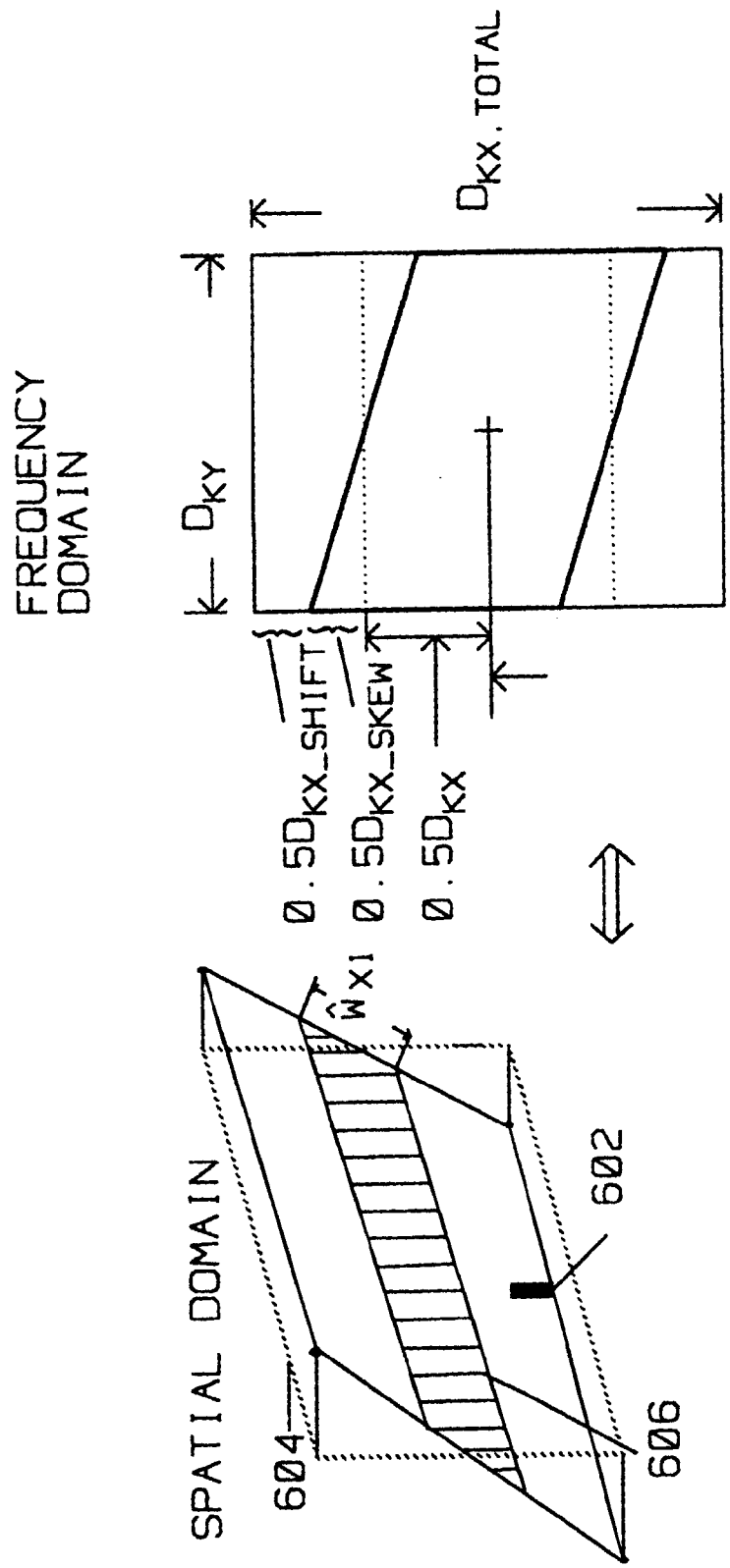
FIG. 6 shows an exemplary alignment of a smeared target in accordance with the invention.

Horizontally skewed image after $FFT_{KY}$ in FIG. 4 is shown in FIG. 6, spatial domain, with the corresponding spectrum that is indicated by the parallelogram in FIG. 6, frequency domain. Original image before horizontal skew is indicated by the dotted parallelogram 604 in FIG. 6, spatial domain. Vertical skew of the spectrum is due to the equivalence of X-dependent shifting in Y and $K_Y$-dependent shifting in $K_X$ based on the equality, $$\frac{\Phi}{2\pi} = K_x \cdot X + K_y(Y - X \cdot \cot \phi) = (K_X - K_y \cdot \cot \phi)X + K_y \cdot Y$$

The purpose of skewing the image horizontally is to transform the image smearing in the vertical direction as indicated by the change of direction of smeared scatterer 501 in FIG. 5 to smeared scatterer 602 in FIG. 6. $D_{KX_{TOTAL}}$ is the total data length in the AT frequency domain after horizontal image skew and signal support shift. It is determined by three contributing factors:

$$D_{K_{X_{TOTAL}}} = D_{KX} + D_{KX_{skew}} + D_{KX_{shift}} \quad (5)$$

Each of the three factors is computed:

$$D_{KX} = \frac{k_X}{\delta_X} = \frac{2L}{R\lambda}\sin\phi$$

$$D_{KY_{skew}} = D_{KY}\cot\phi$$

$$D_{KY_{shift}} = \frac{2}{\lambda}\frac{W_{XI}}{R}$$

where $k_x$ is the main lobe broadening factor,
$\delta_x$ is the image resolution in X,
L is the array length and
$W_{X1}$ is the sub-patch width as indicated in FIG. 5.

Figure 7:
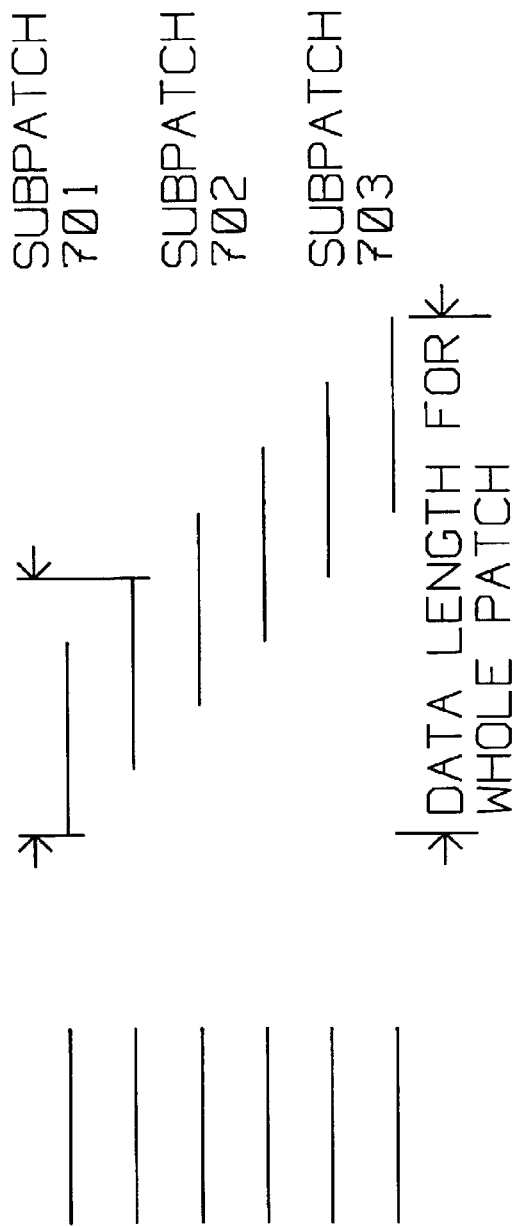
FIG. 7 shows exemplary data shifting from three sub-patches in accordance with the invention.

Next is the estimation of phase error common to all targets. Since overlapped spectrum from different targets are not aligned in time as discussed in section b), it is required to shift the signal support depending on the target displacement in azimuth. Since the stretched data that includes all the shifted signal support is relatively large to be conveniently manipulated in practice, the whole patch is divided into sub-patches for separated phase error estimation on sub-patch basis. Signal support in the frequency domain before and after shifting is illustrated in FIG. 7. The hatched area 503 in FIG. 5 and 606 in FIG. 6(*a*) indicate a sub-patch that has a fixed width in azimuth. Dividing whole patch into sub-patches in azimuth allows maximum sharing of signal support after shifting. As shown in FIG. 6, spatial domain, sub-patch data after horizontal image skew is vertically mis-aligned and it is not efficient in taking sub-patch data. Vertical image skew in the next step is for the vertical alignment of sub-patches. This requires simple vertical shifting of each image column. Unlike horizontal image skew, it is directly done by moving pixel data vertically as determined by Y position. After vertical image skew, sub-patches are vertically aligned as illustrated by the horizontal strip 802 in FIG. 8 and ready to be processed for phase error estimation on sub-patch basis. Detail calculation of sub-patch size and skip in X between sub-patches will be discussed below.

b) Sub-patch Processing

Figure 9A:
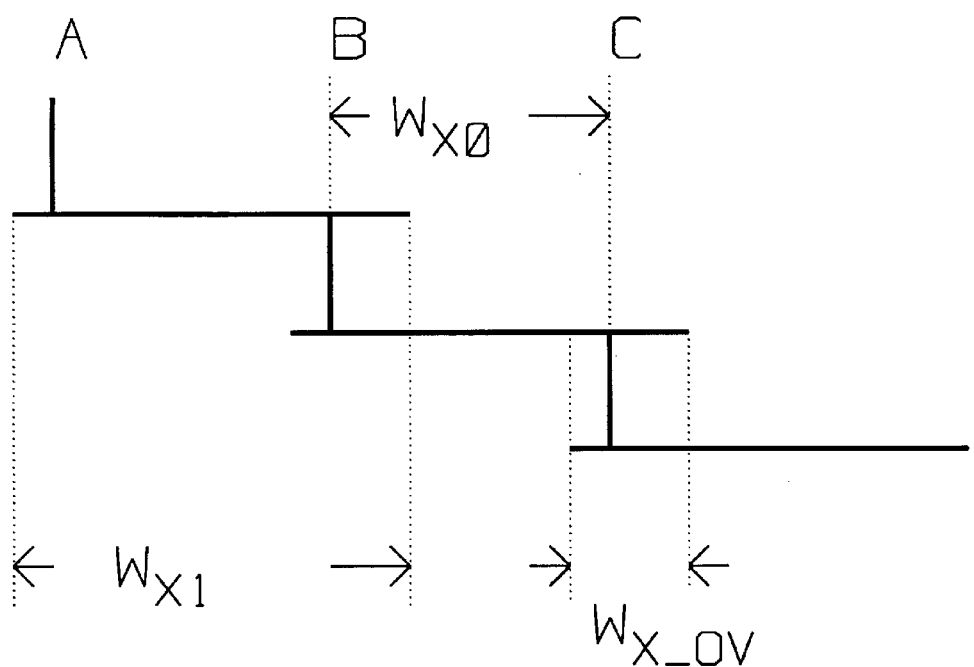
FIG. 9A shows a side view of image sub-patches in accordance with this invention.
Figure 9B:
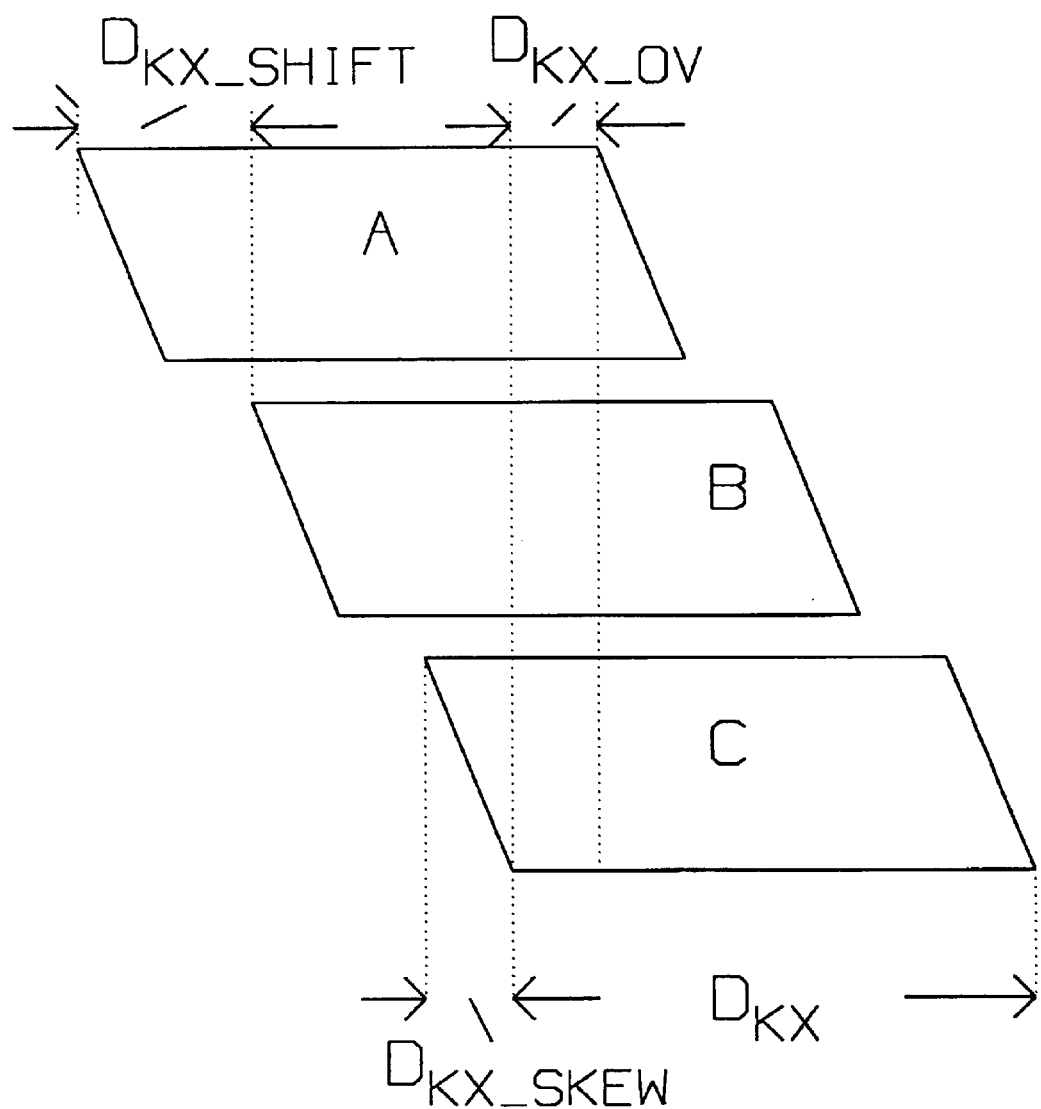
FIG. 9B shows signal supports for three exemplary targets at the patch boundaries, after skewing image and shifting signal support in accordance with the invention.

Since signal supports from different targets in a patch are not aligned in time, to estimate the phase error that is basically a function of time, it is required to shift the signal supports by the amount determined by equation (3) so that they are properly aligned in time. The stretched data length that cover all signal supports is relatively large in search mode since the AT coverage is generally quite substantial. Therefore, it is desired to divide whole image patch into multiple sub-patches that can be individually processed to get the data of reduced length as indicated in FIG. 7. There are two main requirements that need to be considered in processing data on sub-patch basis. First, it is required to maintain overlap of sub-patch images to avoid degradation or discontinuity for the targets around the sub-patch boundaries. Secondly, estimated phase error from neighboring sub-patches needs to be smoothly connected for the magnitude and phase continuity in the final focused complex images. Since the selected targets for the phase error estimation can be located anywhere within a sub-patch we have to set phase overlap based on the worst case. Consider sub-patches divided as shown in FIG. 9(*a*) and their corresponding signal supports after shifting as shown in FIG. 9(*b*).

Condition for the maximum value of sub-patch width is obtained by considering the worst case of maximum target separation by selecting A and C in the first and second sub-patches, respectively, to get $$D_{KX} = 2D_{KX_{shift}} + D_{KX_{ov}} = \frac{4W_{X_{0MAX}}}{R\lambda} + D_{KX_{ov}}$$

This leads to $$W_{X_{0MAX}} = \frac{R\lambda}{4}[D_{KX} - D_{KX_{ov}}] \quad (6)$$

Number of sub-patches with an overlap of $W_{X_{OV}}$ between sub-patches is obtained by $$N_{SP} = \text{ceil}\left[\frac{W_X - W_{X_{ov}}}{W_{X_{0MAX}}}\right] \quad (7)$$

where ceil(x) is used to get the nearest integer greater than or equal to x. $W_{X0}$ and $W_{X1}$ in FIG. 9 can be calculated from $N_{SP}$ $$W_{X0} = \frac{W_X - W_{X_{ov}}}{N_{SP}} \quad (8)$$

$$W_{X1} = W_{X0} + W_{X_{OV}} \quad (8)$$

$D_{K_{shift}}$ due to $W_{X1}$ can be calculated using equation (3)

$$D_{KX_{shift}} = \frac{2W_{XI}}{R\lambda} \quad (9)$$

Total data length $D_{KX_{TOTAL}}$ is then obtained using equation (5) and this allows the calculation of total number of data samples $$N_{DATA} = \frac{D_{KX_{TOTAL}}}{dK_X} \quad (10)$$

For the length of radix-2 FFT, one can find the length that is the nearest integer greater than or equal to $N_{DATA}$ and a power of two.

Denoting this $N_{X_{FFT}}$, the number of padded zeros in FIG. 4 is calculated by $$N_{ZERO} = N_{X_{FFT}} - N_{DATA} \quad (11)$$

Figure 10:
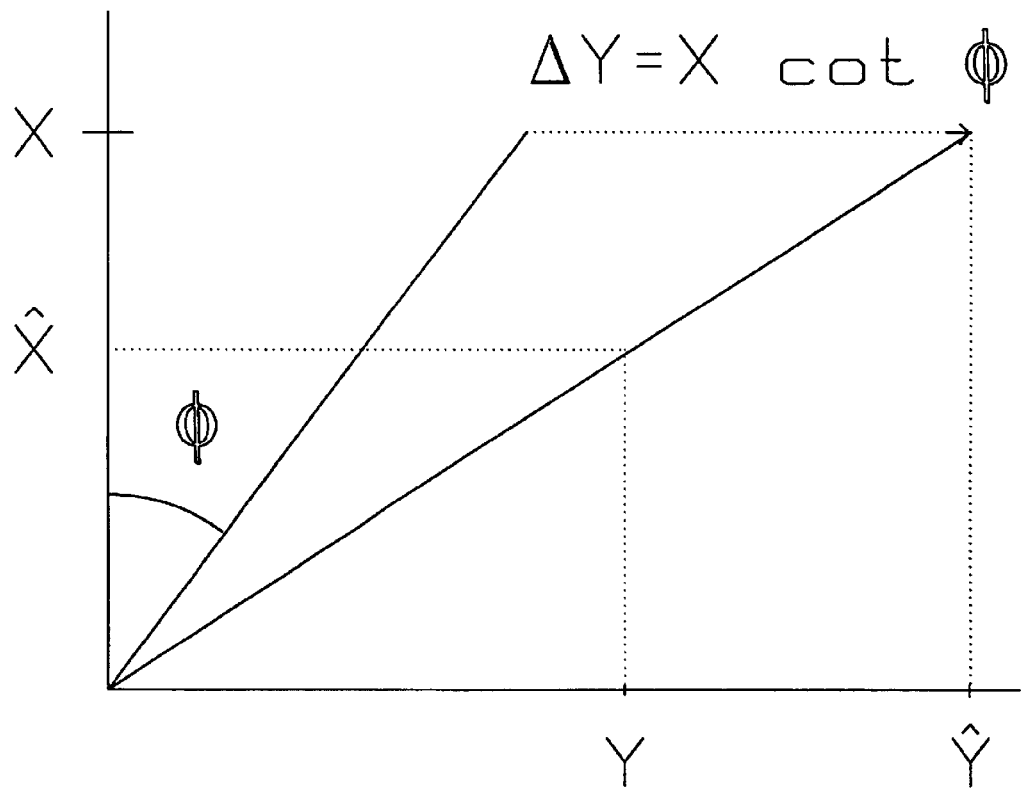
FIG. 10 shows horizontal shifting determined by the vertical displacement in the spatial domain.

To take the sub-patch data as illustrated in FIG. (8), it is required to know the starting data location and size of data. First, compute $W_{X_{SP}}$, the width of the sub-patch strip as marked in FIG. 8. It is identical to $\hat{W}_{X1}$ in FIG. (6) since vertical shift does not change the width. Relations between $\hat{W}_{X1}$ and $W_{X1}$ can be derived from FIG. 10.

$$Y = X \cdot \tan\phi$$

$$\hat{Y} = X(\tan\phi + \cot\phi) = \frac{X}{\sin\phi\cos\phi}$$

Using these, the image block size after data skew, $\hat{W}_{X1}$ is expressed by:

$$\hat{W}_{XI} = W_{XI} \frac{Y}{\hat{Y}} = W_{XI} \sin^2\phi \qquad (12)$$

Figure 8:
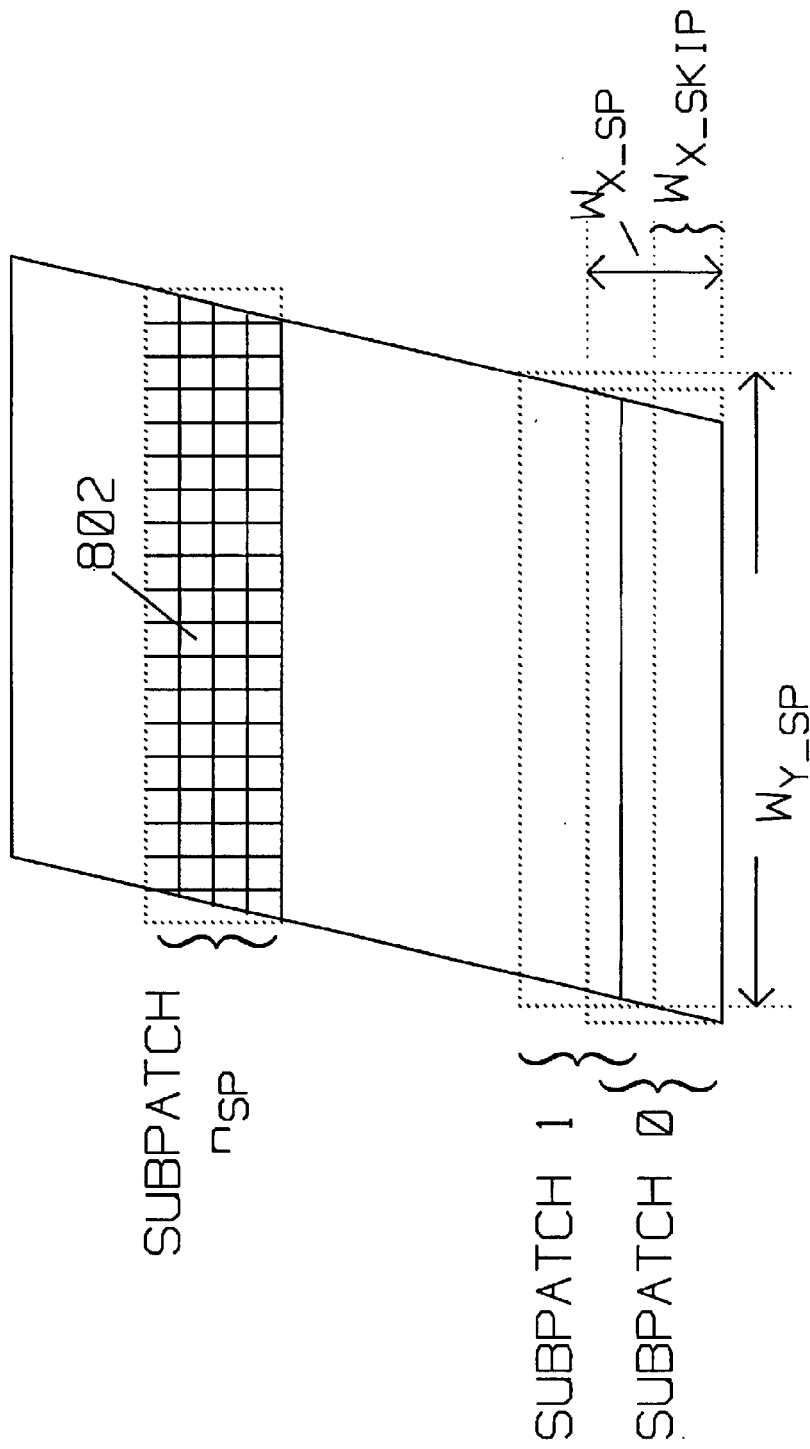
FIG. 8 shows exemplary data overlap of a plurality of sub-patches in accordance with the invention.

Also, slope of the strip in the skewed image in FIG. 8 is obtained by $$\alpha = \frac{X}{\hat{Y}} = \sin\phi\cos\phi \qquad (13)$$

From equations (12) and (13), the size of sub-patches $W_{X_{SP}}$ and $W_{Y_{SP}}$ can be calculated from $$W_{X_{SP}} = \hat{W}_{XI} = W_{XI}\sin^2\phi \qquad (14)$$

$$W_{Y_{SP}} = \frac{W_Y \cot\phi}{\alpha} + W_{XI}\cot\phi = \frac{W_Y}{\sin^2\phi} + W_{XI}\cot\phi$$

Similarly, $W_{X_{SKIP}}$ is calculated from $W_{X0}$.

$$W_{X_{SKIP}} = W_{X0}\sin^2\phi \qquad (15)$$

Pixel spacing of the interpolated image in X is $$dX = \frac{1}{dKX \cdot N_{X_{FFT}}}$$

where dKX is the sample interval of the Stolt output in KX.

Next, position of the first samples, $(N_{X_{START}}, N_{Y_{START}})$ and the number of image samples $(N_{X_{SP}})$ for sub-patch $n_{sp}$ are calculated from:

$$N_{X_{START}} = floor\left\{\frac{n_{SP} \cdot W_{X_{SKIP}}}{dX}\right\} \qquad (16)$$

$$N_{Y_{START}} = floor\left\{\frac{n_{SP} \cdot W_{X_{SP}} \cdot \cot\phi}{dY}\right\}$$

$$N_{X_{SP}} = ceil\left\{\frac{W_{X_{SP}}}{dX}\right\}$$

$$N_{X_{SP}} = ceil\left\{\frac{W_{Y_{SP}}}{dY}\right\}$$

where floor(x) is used to get the nearest integer less than or equal to x and dY is the initial pixel spacing in Y.

Part (b) is for the estimation and correction of phase error for each sub-patch using the same processing routine. It can be processed either in sequential or in parallel manner. The first function after taking sub-patch data using the parameters expressed so far is the application of quadratic phase function $\phi_{shift}$ used in FIG. 4. The quadratic phase function shifts the signal support as a linear function of azimuth displacement, as expressed in equation (3). Define a vector of length $N_{X_{SP}}$ as $$V_{X_{SP}} = -\frac{N_{X_{SP}}-1}{2}, -\frac{N_{X_{SP}}+1}{2}, \ldots \frac{N_{X_{SP}}-1}{2}$$

Then $\phi_{shift}$ is given by:

$$\phi_{shift}(V_{X_{SP}}) = 2\pi \frac{dX \cdot (V_{X_{SP}})^2}{R \cdot \lambda \cdot \sin^4\phi} \qquad (17)$$

where $(V_{X_{SP}})$ is a vector with each element $V_{X_{SP}}$ squared.

The next step after applying the quadratic phase for the shifting of signal support is the conversion of data from spatial domain X to the frequency domain $K_X$ by the function $FFT_X$ in FIG. 4. This is where any autofocus algorithms can be implemented for phase error estimation. If non-parametric autofocus algorithms such as phase gradient autofocus algorithm (PGA) or multiple discrete autofocus algorithm (MDA) are used, it is required to select good isolated point targets in the image domain before taking the FFT.

It should be noted that usable portion of signal spectrum of each target after being synchronized in time is not fully overlapped because overlapped spectra are shifted depending on the relative target position in azimuth. Therefore, the linear terms of phase derivatives from all target spectra are not the same in general and removal of constant and linear terms in phase derivatives leads to the residual phase errors that are not the same between targets. Then, averaging the residual first derivatives that are different between targets results in incorrect estimation of phase derivative and phase error. To resolve this problem, two methods are proposed.

The first method is to calculate the second derivatives of the phase for all targets and getting the weighted average before integrating them twice for phase error estimates.

The second method is to estimate the derivatives of phase errors from the selected targets in the overlapped region only and compute the average of them.

Expression for the second derivative of phase for the first method in the spatial frequency domain is obtained as follows.

$$x = A \cdot e^{j\theta}$$

$$x' = j\theta' \cdot x$$

$$\theta' = \frac{x^*x'}{j|x|^2} = Im\left(\frac{x^*x'}{|x|^2}\right)$$

$$\theta'' = Im\left(\frac{x''x - (x')^2}{x^2}\right) = Im\left(\frac{x^*x''}{|x|^2} - \frac{(x^*x')^2}{|x|^4}\right)$$

After computing the weighted average of the second derivative, phase error estimates are obtained by integrating the estimated second phase derivative twice. This first method can also be used for the continued phase error estimates between neighboring sub-patches.

Figure 11:
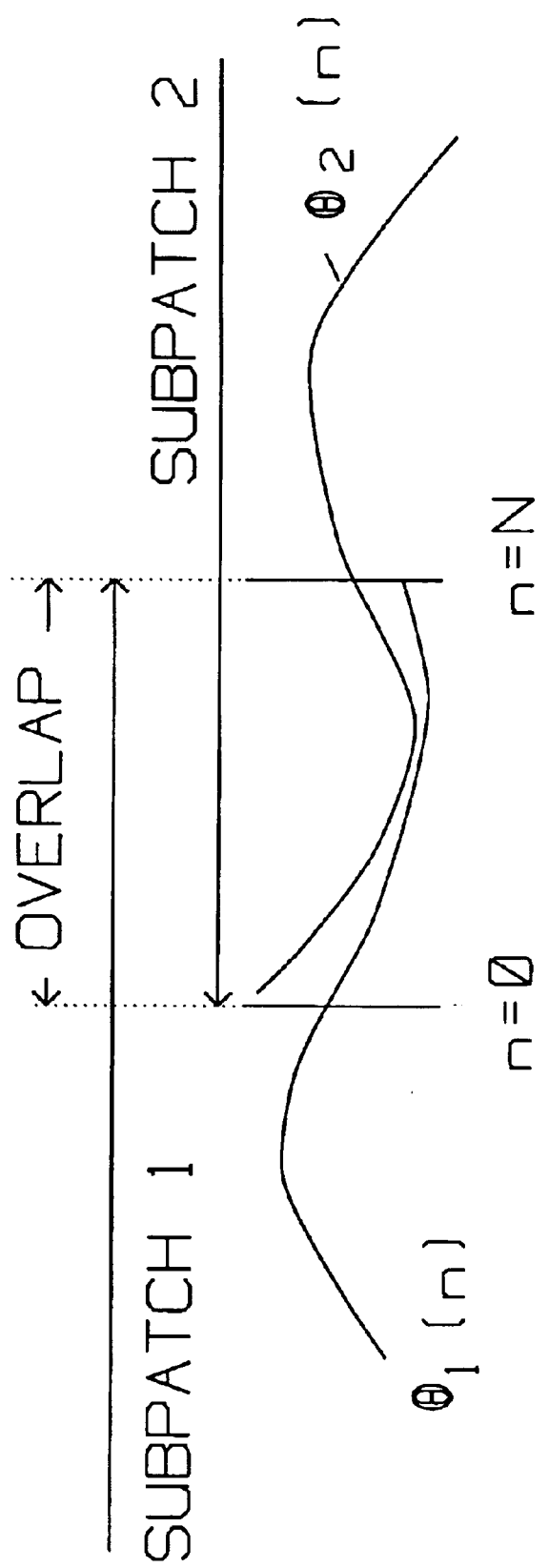
FIG. 11 shows overlapped phase error estimates from two sub-patches.

To combine phase error estimates from subsequent sub-patches using the second method, constant and linear terms of the phase error estimates in each sub-patch are removed first using the data in the overlapped spectra region. Then, for smooth transition between sub-patch phase estimates, there is an overlapped phase error between two neighboring sub-patches after proper shifting for alignment in time as shown in FIG. 11. Denoting the estimated phase error by $\theta_1(n)$ and $\theta_2(n)$ for n=0, 1, ..., N in the overlapped region, smooth transition in phase is completed in accordance with:

$$\theta(n) = \frac{(N-n) \cdot \theta_1(n)}{N} + \frac{n \cdot \theta_2(n)}{N} \qquad (18)$$

Phase error that needs to be corrected is extracted from the composite phased error that was obtained by making smooth transition between phase estimates from sub-patches. After phase correction it is required to shift back the shifted signal support by applying quadratic phase $-\phi_{shift}$ to the sub-patch images. Next, by taking part of each sub-patch image with the size of $W_{X_{SKIP}}$ except the first and the last sub-patches as shown in FIG. 8 and concatenating them, skewed and focused image are obtained.

Image Deskew

Part c) is for the backward processing of part a) to get the unskewed image after phase error correction in part b). Parameters used for part a) can be saved and used for the processing in part c). All functions in part c) are the inverse of those in part a) and therefore are not repeated here. Since zeros were padded in the beginning of part a) to make a room for image skew and signal support shift, data in the frequency domain at the end of part c) after IFFT$_X$ in FIG. 8 includes zeros. Taking FFTs in the AT and CT direction sequentially with appropriate number of padded zeros for the desired pixel spacing produces focused image oriented in AT-CT. Proper weighting can be applied before FFTs for sidelobe suppression. Alternatively, spatially variant apodization (SVA) can be implemented after FFTs without applying weighting functions.

Summary of Processing

The following method steps further detail the invention:
1. Set the desired overlap between sub-patches. This can be determined from the expected maximum amount of image smearing. Smearing comes from residual errors in motion compensation of radar returns.
2. Set the desired overlap between phase error estimates by two targets separated by two sub-patch width. It can be set as a fraction of initial signal support length.
3. Compute the required number of zeros to be padded using equations (6) through (11).
4. Compute the horizontally skewed image by taking two dimensional FFTs in the frequency domain. Linear phase is applied after the first FFT in K$_X$. This aligns the image smearing with the vertical (final image) pixel direction.
5. Compute the vertically skewed image by shifting image data vertically as a linear function of the horizontal position. This is to align sub-patches horizontally for efficient data taking for each sub-patch.
6. Compute sub-patch size and starting sample locations using Equations (8) and (14) through (16).
7. Take the sub-patch data based on the calculated parameters in step 6.
8. Apply any efficient autofocus algorithm for the estimation of phase error in each sub-patch.
9. Repeat step 7 and 8 for all sub-patches.
10. Combine phase error estimates from sub-patches by proper shifting and making smooth transition using (18).
11. Extract correction phase for each sub-patch and apply.
12. Combine sub-patch images for composite image of whole patch.
13. Perform backward processing to deskew image vertically and horizontally. The initial amount of skewing is known.
14. Compute FFTs to get de-skewed and focused final image after taking data with desired number of padded zeros. Weighting or SVA can be chosen as desired.

Summarizing from another point of view, the method for acquiring synthetic aperture images of stationary targets using a radar system, said radar system located on a moving platform, comprises the steps of:
a) Converting a plurality of radar signals reflected from stationary targets located on a ground patch into digital values. These digital values, typically I and Q components, are representative of phase and amplitude of the return signal, and are acquired using Analog to Digital converters.
b) Storing said digital values in a memory such as RAM or hard drive, including a time of arrival reference.
c) Motion compensating said digital values stored within said memory with respect to a time reference to a first approximation of motion of said moving platform. The first approximation of motion contains the uncompensated errors arising from inaccuracies in motion compensation. These errors in motion compensation introduce a mis-alignment in the phase characteristic of received signals, and smears the image, elongating point targets.
d) Interpolating said digital values to generate interpolated values, generally using a Stolt interpolator.
e) Skewing said interpolated values to reorient distortions arising from said first approximation of motion in a preferred direction, in accordance with FIG. 5 and FIG. 6, thereby generating an image data, said image data descriptive of said stationary targets in a range direction and in a cross-track direction. Skewing said interpolated values is first computed in one direction and subsequently in a second direction, where the first direction is perpendicular to the second direction, typically in alignment with image display pixel orientation.
f) Dividing said image data into a plurality of overlapping sub-patches, each sub-patch containing a portion of said image data and overlapping data, said overlapping data part of said image data and common between two or more of said overlapping sub-patches as shown in FIG. 8. The overlapping sub-patches divide said image data in said cross track direction.
g) Focusing each of said overlapping sub-patches individually using autofocus means to obtain focused sub-patches having a phase. Focusing a smaller sub-patch is done quicker than focusing the larger patch. Also, the focusing operation proceeds in parallel, generating concurrent focused sub-patches. Autofocus can be computed using the phase gradient autofocus algorithm or a multiple discrete autofocus algorithm.
h) Adjusting said phase of each of said focused sub patches to obtain a continuous phase with respect to one or more of said focused sub-patches, thereby obtaining smooth phase transition sub-patches. See FIGS. 9A and 9B, equations 6–16.
i) Extracting said synthetic aperture images of stationary targets after concatenating said smooth phase transition sub-patches. Once the sub-patches are aligned in time, see eq 17 and FIG. 11, the image is extracted using typical SAR methods. For smoothing purposes across two or more sub-patches, the phase of a each sub-patch is calculated by integrating twice the second derivatives of target phase descriptive of all of said stationary targets contained within each of said focused sub-patches and computing the weighted average of said second derivatives. Another method for computing phase is calculated by removing constant terms and linear terms in said phase using said overlapping data.

Figure 4A:
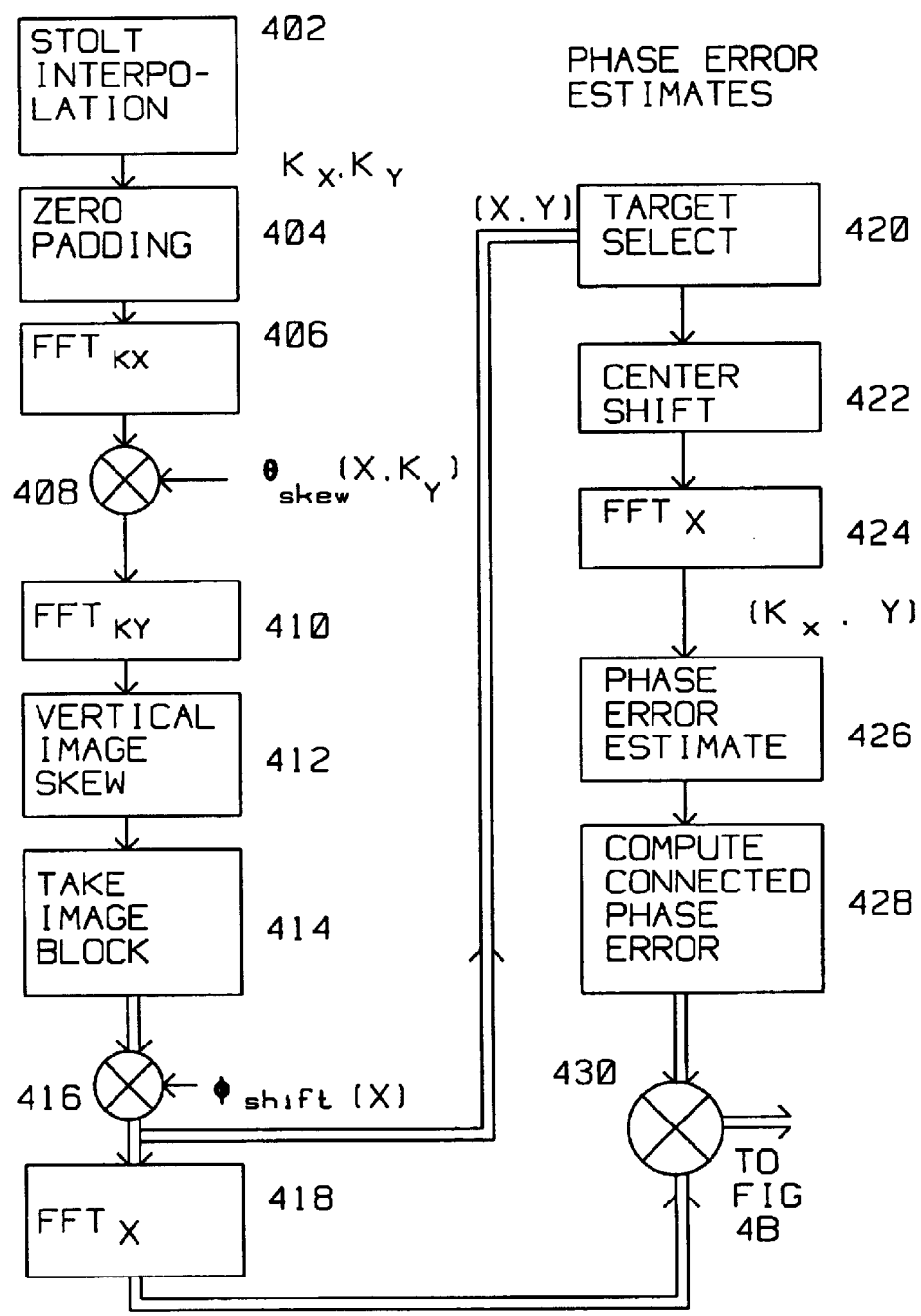
FIGS. 4A and 4B is the signal processing sequence used in this invention.
Figure 4B:
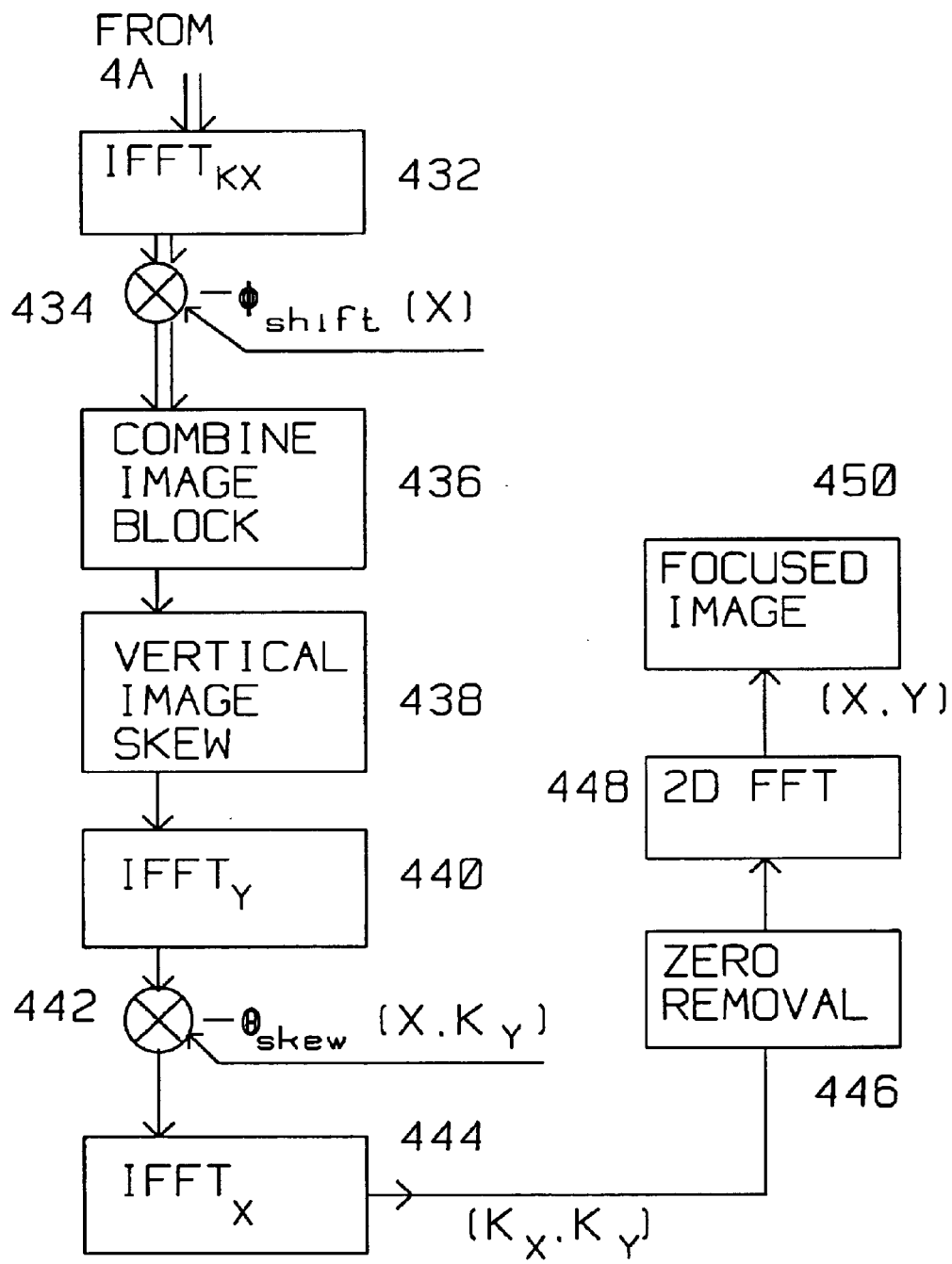

Above method steps are further illustrated in FIG. 4A and FIG. 4B, and should be interpreted in conjunction with the analysis provided.

In FIG. 4A, a Stolt interpolation 402 is conducted on the incoming data. The resulting K$_X$,K$_Y$ data is zero padded in zero padding 404. FFT$_{KX}$ 406 makes the data compatible with skewing. The data is skewed by an amount $\theta_{skew}$ in skewing 408. FFT$_{KY}$ 410 prepares the resulting data for vertical image skew 412. After take image 414 is computed, it is shifted in $\phi_{shift}(X)$ 416. FFT$_X$ 418 performs an FFT in the X direction.

One branch takes the data for phase error estimates for a particular target. The target is selected within target select 420. enter shift is computed in 422. $FFT_X$ 424 is performed on the data. This leaves the $K_X$, Y information. Phase error estimate 426 extracts the apparent phase error. Compute connected phase error 428 examines the data for phase errors. The results from 428 are combined with results in 418 in shifter 430 followed by Inverse FFT $IFFT_{KX}$ 432 in FIG. 4B.

Further in FIG. 4B, the inverse FFT from 432 is shifted by an amount $-\phi_{shift}(X)$ in shifter 434. The results are combined in Combine Image Block 435. Vertical image skew 438 skews the resultant data which is then processed by inverse FFT $IFFT_Y$ 440. In turn, the results from 440 are shifted by an amount $-\theta_{shift}(X, K_Y)$ in preparation for the final image synthesis from sub-patches. $IFFT_X$ 444 takes the shifted results from 442 and presents them to Zero Removal 446. Zero removal 446 prepares the data for 2D FFT 448 which in turn generates the final, focused image 450 in X, Y.

All references cited in this document are incorporated herein in their entirety.

Although presented in exemplary fashion employing specific embodiments, the disclosed structures are not intended to be so limited. For example, the order of performing the horizontal and vertical skew functions can be interchanged while still within the scope of the invention. While a Stolt interpolation is envisioned as a source of data, any other complex interpolator is within the scope of the invention.

Those skilled in the art will also appreciate that numerous changes and modifications could be made to the embodiment described herein without departing in any way from the invention. These changes and modifications and all obvious variations of the disclosed embodiment are intended to be embraced by the claims to the limits set by law.

What is claimed is:

1. A radar system for acquiring synthetic aperture images of stationary targets, said radar system located on a moving platform, said moving platform moving in an along track direction, said along track direction perpendicular to a cross track direction, said radar system comprising:

an analog to digital converter for converting a plurality of radar signals reflected from stationary targets located on a ground patch into digital values;

memory for storing said digital values;

motion compensation means for aligning said digital values stored within said memory along a motion compensation line to a first approximation of motion of said moving platform to generate motion compensated digital values;

Fourier transform means for the conversion of said motion compensated digital values in said along track direction to a frequency domain;

match filter function means to generate range compressed data for said stationary targets on said motion compensation line within said frequency domain;

a Stolt interpolator for interpolating said range compressed data to generate interpolated values;

means for skewing said interpolated values to reorient distortions arising from said first approximation of motion thereby generating an image data, said image data descriptive of said stationary targets in a range direction and an azimuth direction, said azimuth direction generally in said cross track direction;

means for dividing said image data into overlapping sub-patches, each sub-patch containing a portion of said image data and overlapping data, said overlapping data part of said image data and common between two or more of said overlapping sub-patches;

means for focusing each of said overlapping sub-patches individually using autofocus means to obtain focused sub-patches having a phase;

means for adjusting said phase of each of said focused sub-patches to obtain a continuous phase with respect to one or more of said focused sub-patches, thereby obtaining smooth phase transition sub-patches;

means for extracting said synthetic aperture images of stationary targets after concatenating said smooth phase transition sub-patches.

2. A radar system as described in claim 1 wherein said means for skewing said interpolated values is first computed in one direction and subsequently in a second direction.

3. A radar system as described in claim 2 wherein said means for skewing said second direction is perpendicular to said first direction.

4. A radar system as described in claim 1 wherein said autofocus means comprise a phase gradient autofocus algorithm.

5. A radar system as described in claim 1 wherein said autofocus means comprise a multiple discrete autofocus algorithm.

6. A radar system as described in claim 1 wherein said overlapping sub-patches divide said image data in said azimuth direction.

7. A radar system as described in claim 1 wherein said phase is calculated by integrating twice the second derivatives of target phase descriptive of all of said stationary targets contained within each of said focused sub-patches and computing the weighted average of said second derivatives.

8. A radar system as described in claim 1 wherein said phase is calculated by removing constant and linear terms in said phase using said overlapping data.

9. A method for acquiring synthetic aperture images of stationary targets using a radar system, said radar system located on a moving platform, said moving platform moving in an along track direction, said along track direction perpendicular to a cross track direction, comprising the steps of:

converting a plurality of radar signals reflected from stationary targets located on a ground patch into digital values;

storing said digital values;

motion compensating said digital values stored within said memory to a first approximation of motion of said moving platform to generate motion compensated data;

transforming said motion compensated data in said along track direction into a frequency domain using a Fourier transform to generate frequency domain data;

performing a matched filter operation on said frequency domain data to generate matched data;

interpolating said matched data to generate interpolated values; skewing said interpolated values to reorient distortions arising from said first approximation of motion in a preferred direction thereby generating an image data, said image data descriptive of said stationary targets in a range direction and an azimuth direction;

dividing said image data into a plurality of overlapping sub-patches in said cross track direction, each sub-patch containing a portion of said image data and overlapping data, said overlapping data part of said image data and common between two or more of said overlapping sub-patches;

focusing each of said overlapping sub-patches individually using autofocus methods to obtain focused sub-patches having a phase;

adjusting said phase of each of said focused sub patches to obtain a continuous phase with respect to one or more of said focused sub-patches, thereby obtaining smooth phase transition sub-patches;

extracting said synthetic aperture images of stationary targets after concatenating said smooth phase transition sub-patches.

10. A method as described in claim 9 wherein skewing said interpolated values is first computed in one direction and subsequently in a second direction.

11. A method as described in claim 10 wherein said second direction is perpendicular to said first direction.

12. A method as described in claim 9 wherein said autofocus means comprise a phase gradient autofocus algorithm.

13. A method as described in claim 9 wherein said autofocus means comprise a multiple discrete autofocus algorithm.

14. A method as described in claim 9 wherein said overlapping sub-patches divide said image data in said azimuth direction.

15. A method as described in claim 9 wherein said phase is calculated by integrating twice the second derivatives of target phase descriptive of all of said stationary targets contained within each of said focused sub-patches and computing the weighted average of said second derivatives.

16. A method as described in claim 9 wherein said phase is calculated by removing constant terms and linear terms in said phase using said overlapping data.

* * * * *